United States Patent [19]

Yang

[11] Patent Number: 5,278,654
[45] Date of Patent: Jan. 11, 1994

[54] TV POWER SUPPLY CONTROL METHOD AND CIRCUIT WITH AUTOMATIC STANDBY MODE

[75] Inventor: Jun-Hen Yang, Kyonggi-do, Rep. of Korea

[73] Assignee: Samsung Electronics Co., Ltd., Rep. of Korea

[21] Appl. No.: 918,035

[22] Filed: Jul. 24, 1992

[30] Foreign Application Priority Data

Jul. 26, 1991 [KR] Rep. of Korea .............. 91-12927

[51] Int. Cl.$^5$ ............................................. H04N 5/63
[52] U.S. Cl. ................................. 358/190; 358/188
[58] Field of Search ..................... 358/190, 188; H04N 5/63

[56] References Cited

U.S. PATENT DOCUMENTS

| 4,321,593 | 3/1982 | Ho et al. | 358/190 |
| 4,641,191 | 2/1987 | Sutton | 358/190 |
| 4,843,464 | 6/1989 | Choi | 358/190 |

FOREIGN PATENT DOCUMENTS 4175079A 6/1992 Japan .......................... H04N 5/63

*Primary Examiner*—Mark R. Powell
*Assistant Examiner*—Jeffrey S. Murrell
*Attorney, Agent, or Firm*—Sughrue, Mion, Zinn, Macpeak & Seas

[57] ABSTRACT

The present invention relates to a television power supply control method and circuit and more particularly to a TV power supply control method and circuit which automatically controls the power supply after a predetermined time period has elapsed after a viewer has left a seat and failed to turn off the power to the television. The television switches to an operation standby mode. There is thus no need to turn off the power every time the viewer leaves the room. Not only is an unnecessary waste of power prevented; also, damage to the TV due to overheating can be avoided.

11 Claims, 2 Drawing Sheets

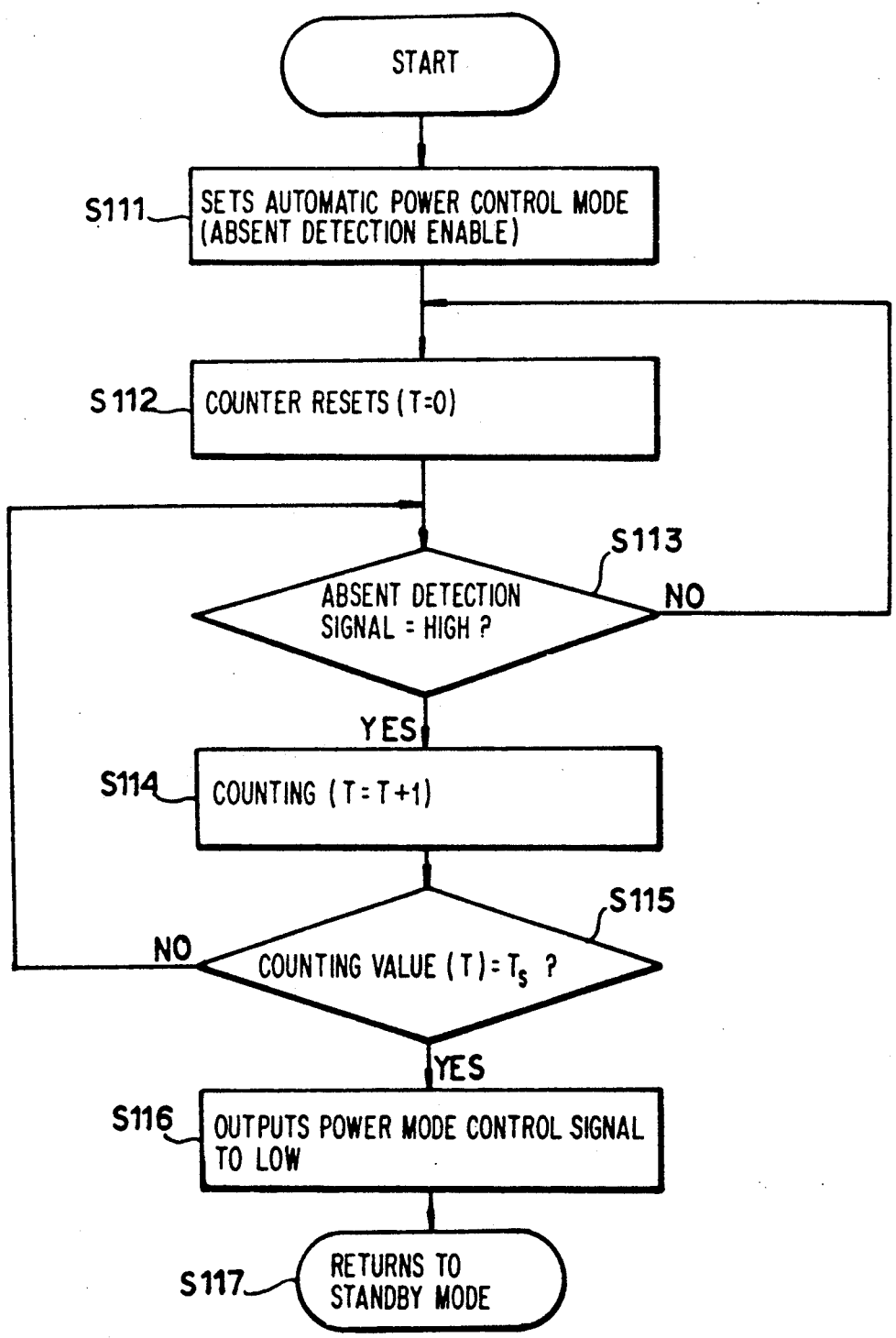

TV POWER SUPPLY CONTROL METHOD AND CIRCUIT WITH AUTOMATIC STANDBY MODE

FIELD OF THE INVENTION

The present invention relates to a television (TV) power supply control method and circuit, and more particularly to a TV power supply control method and circuit which causes a TV to stand by. In standby mode, the power supply of the TV receiver is turned off once a prolonged absence of a viewer is sensed.

BACKGROUND OF THE INVENTION

Generally, a viewer turns the power on by manipulating a power key (or button), thereby causing the power supply to be applied to the television. When the power supply to the TV receiver is turned off, a control means (e.g., a microprocessor) contained in the receiver executes a standby mode.

In such an operation standby mode, a key scan and a preheating operation are carried out, so that, when the viewer turns the power to the TV on, immediate viewing is possible.

Accordingly, in order to shut the TV off after viewing, televisions, according to the prior art, could be turned off only by executing the power off action every time. Furthermore, the prior art televisions remain in an on state until the power is turned off even when the viewer is absent.

Therefore, in a conventional TV, whenever the power is not turned off due to the carelessness of the viewer after viewing, and particularly in cases where children simply leave the TV turned on, an unnecessary consumption of power as well as potential damage to the TV apparatus through overheating result.

SUMMARY OF THE INVENTION

Therefore, an object of the present invention is to provide a TV power supply control method and circuit which search whether any viewer is within a particular space by sensing whenever the TV is in a "power-on" state. Whenever it is determined that no viewer is present, the power of the TV receiver is automatically turned off and switched to an operation standby mode. This results not only in preventing an unnecessary use of power but also protects and extends the life of the TV apparatus itself.

According to the present invention, a TV power supply control method includes a first step for judging whether or not a viewer is absent when a power supply automatic control mode is set, and a second step for switching the TV to a standby mode when it is judged that the viewer is absent, as a result of said first step. Further, according to the present invention, a TV power supply control circuit includes a sensing section for detecting any viewer, a driving section for converting a signal detected at said sensing section to a logical level and for outputting an absence signal, a logical section for outputting an absence detection signal in accordance with an absence detection enable signal and the absence signal of said driving section, and a control section for controlling a power supply section. The power supply section supplies the power to various sections of the system, in accordance with the absence detection signal of the logic section, if the control circuit has been set to a power supply automatic mode. The control circuit may further include a deflecting section for deflecting a scanning of a display and thereby switching the TV to the operation standby mode, so that an unnecessary waste of power is prevented, and also damage due to overheating of the TV is avoided.

BRIEF DESCRIPTION OF THE DRAWINGS

These and other objects and advantages of the present invention will become apparent by reference to the following description and accompanying drawings wherein:

FIG. 2 is a flow chart of a TV power supply control method in accordance with the present invention.

DETAILED DESCRIPTION OF THE PREFERRED EMBODIMENTS

Figure 1:
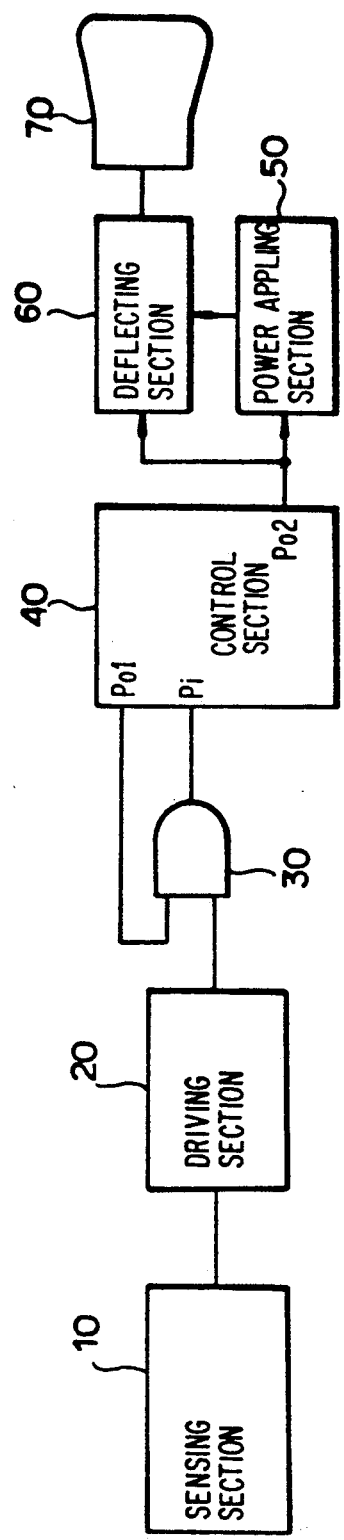
FIG. 1 is a block diagram of a TV power supply control circuit in accordance with the present invention.

FIG. 1 shows a block diagram of a TV power control circuit in accordance with the present invention. The control circuit includes a sensing section 10 for sensing any viewer, a driving section 20 for converting a signal detected at the sensing section 10 to a logical level and for outputting an absence signal, and a logical section 30 for outputting an absence detection signal in accordance with an absence detection enable signal and the absence signal of the driving section 20. The control circuit further includes control section 40 for controlling a power supply section 50, which supplies power to each section of the system, and a deflecting section 60 for deflecting the scanning of a display 70, thereby switching the TV to an operation standby mode.

In a preferred embodiment, the sensing section 10 is constituted by a pypoelectrical sensor for sensing pypoelectricity emitted from a human body and thereby detects a presence or absence of the viewer.

The driving section 20 amplifies the signal detected at the sensing section 10 so that the amplified signal is output to the logical section 30.

The logical section 30 is preferably constituted by an AND gate. If the absence signal of said driving section 20 and the absence detection enable signal outputted from a first output terminal P01 of the control section 40 simultaneously trigger the logical section 30, section 30 outputs an absence detection signal, which sets the power supply automatic control mode, in accordance with the present invention.

The control section 40 can be used by programming the control method of the present invention into a main microprocessor of the TV or, e.g., into a separate one chip microprocessor.

The power supply section 50 receives AC power from an AC power supply line, transforms and rectifies it, and then supplies the power to appropriate sections of the TV.

The deflecting section 60 and the display 70 are the same as the picture reproducing means employed in normal TV sets.

FIG. 2 shows a flow chart of the TV control method, in accordance with the present invention. The power supply control method, according to the present invention is executed when the power supply automatic control mode is set. That is, when the power supply automatic mode is set, the power supply control method, in accordance with the present invention, is executed. This method utilizes a first step for judging whether a viewer is present or not, and a second step for switching the TV to an operation standby mode, when it is determined that no viewer is present, as a result of the judging performed in the first step.

Hereinafter, the power supply control method and circuit, in accordance with the present invention, will be described in detail with reference to the accompanying drawings as follows.

In FIG. 1, when a viewer wants to see a television broadcasting program and presses a power key (not shown) at a time when the TV is executing the operation standby mode, an operation signal (which is a signal of logical level and is usually "high or Hi" or "low or Lo" signal) is output, and the power supply of the power supply section 50 is supplied to each section of the television system in accordance with the operation signal. Also, the deflecting section 60 starts a deflecting operation, so that the TV broadcast may be viewed by way of the display means 70.

When the power supply automatic mode is not set, the control section 40 outputs a "Lo" signal at the first output terminal P01. Thus, even if an absent signal is detected at the sensing section 10, the control section 40 fails to receive a "Hi" signal from the logical section 30, thereby disabling the absent detection.

When the viewer again presses the power key (the power key alternatively repeats on and off when repeatedly pressing it) while watching the television broadcast, an operation off signal is output at a second output terminal P02 of the control section 40. The power supply of the power supply section 50 is cut off by the operation off signal, with only a preheating power being applied to the deflecting section 60. When the preheating power is applied to the deflecting section 60, the deflecting section 60 stops the deflecting operation and executes a preheating operation in which the display means receives power from a preheating power source.

Accordingly, when the power supply automatic control mode is not set, the TV system performs just like a common TV, regardless of whether or not there is an absence detection.

On the other hand, when the viewer sets the power supply automatic control mode during viewing of the television broadcast by turning on the power supply as described above, the control section 40 outputs an absence detection enable signal to the first output terminal P01 (at step S111) and at the same time resets (T=0) a counter (at step S112). In addition, an absence detection enable signal of Hi level, output from the control section 40, is applied to the logical section 30, thereby placing the logical section 30 in an enable state.

In this state, when the viewer is absent, the sensing section 10 cannot sense the pypoelectricity generated from a human body. This leads the driving section 20 to output a Hi signal. As a result, the output of the logical section 30 becomes Hi because of the Hi signal of the driving section 20. This Hi output of the logical section 30 is then applied to an input terminal Pi of the control section 40.

The control section 40 is signalled that the viewer is absent when the Hi signal is input to the input terminal Pi (at steps S113). The control section 40 commences a counting operation (T=T+1) (at step S114) and determines whether or not the counting value T has reached a setting value Ts (at step S115).

The setting value Ts is a value corresponding to the amount of time that has elapsed since the viewer stopped watching the television yet failed to turn off the TV. In a further preferred embodiment, the setting value Ts may be set or changed by the user.

Accordingly, when, for example, the setting value Ts is set to a value corresponding to 30 minutes and the viewer is absent for a successive period of more than 30 minutes, the counting value T successively increases (T=T+1) until the counting value T becomes equal to the setting value Ts.

When the counting value T becomes equal to the setting value Ts (T=Ts, at step 115), the control section 40 outputs a control signal of "Lo" to the second output terminal P02 (at step S116). The power supply of the power supply section 50 is cut off by the control signal and the preheating power supply is applied to the deflecting section 60. When the preheating power supply is applied to the deflecting section 60, the deflecting section 60 stops the deflecting operation and executes, instead, the preheating operation of the display means with the preheating power supply.

Thus, when the power supply automatic mode is set and the absence of the viewer is maintained more than a predetermined time period, the TV executes the operation standby mode (at step S117).

However, when a viewer is present, the pypoelectricity generated from a human body is detected by the sensing section 10. When the viewer is detected by the sensing section 10, a Lo signal is output from the driving section 20 and is applied to the logical section 30, the output of the logical section 30 is disabled, and, once the absence signal is detected at the control section 40 (at step S113), the counter is reset (at step S112).

And, in case the viewer begins viewing again before the setting time is spent, the counter is reset (T=0, at step S112). Since the absence signal is not detected by the control section 40 during the time the counter is counting up to the setting value T3 (at step S113), viewing is not interrupted.

Use of the counter and the setting value Ts ensures that the system does not erroneously determine an absence in cases where the viewer leaves only for a moment while viewing the television, or where the sensing range of the sensing section is momentarily deviated.

Accordingly, the control means 40 determines that viewers are absent only in cases where the "absent" time period, during which the counter counts up to said setting value, has elapsed.

As described above, according to the present invention, whenever viewers leave the viewing area without turning off the power to the television set and after a predetermined time period has elapsed, the power supply to the television is automatically controlled and switched to an operation standby mode so that there is no need to turn off the power every time. As a result, it becomes possible not only to prevent an unnecessary consumption of power but also to avoid damage that may be caused to the television due to overheating.

Although a preferred embodiment of the invention is described, various changes may be made without departing from the scope of the present invention.

Particularly, it is also possible to realize the invention in an embodiment in which the logical section employed is a NOR gate, or in an embodiment in which signals opposite to the ones of the described embodiment are output, or in an embodiment in which the logical section is constituted differently, and so on.

In addition, the present invention can be utilized with a television as well as a general voice and video processing system.

What is claimed is:

1. Television power supply control method comprising:
   a first step for determining whether or not a viewer is present and for outputting a first signal when it is determined that no viewer is present;
   a second step in which a viewer sets a power supply automatic control mode, and for outputting a second signal when the power supply automatic control mode is set; and
   a third step for switching a television to an operation standby mode after the viewer sets the power supply automatic control mode in said second step and after it is determined in said first step that no viewer is present, said third step including the step of ANDing the first and second signals.

2. Television power supply control method comprising:
   a first step for determining whether or not a viewer is present; and
   a second step for switching a television to an operation standby mode when it is determined in said determining step that no viewer is present, said first step comprising:
   a mode setting step for setting a power supply automatic control mode,
   a counter resetting step for resetting a counter when the power supply automatic control mode is set,
   an absence determining step for determining an absence or presence of the viewer, for altering a counter value of the counter when no viewer is present, and for repeatedly executing said counter resetting step when any viewer is present, and
   a counter value comparing step for comparing the counter value with a setting value after altering the counter value when it is determined, in said absence determining step, that no viewer is present, and, when the counter value has a predetermined relation with the setting value, determining that no viewer is present, and, when the counter value does not have the predetermined relation with the setting value, again executing the absence determining step.

3. Television power supply control method as defined in claim 2, wherein the setting value corresponds to time period which indicates a that the viewer has finished viewing television and forgotten to turn off power to the television.

4. Television power supply control method as defined in claim 2, wherein the counter value is incrementally increased, and
   wherein the predetermined relation is an equality relation in said counter value comparing step.

5. Television power supply control method as defined in claim 2, wherein the setting value is programmable by the viewer.

6. Television power supply control method as defined in claim 1, said third step comprising:
   a control signal outputting step for outputting a power supply control signal once it is determined in said first step that no viewer is present and the power supply automatic control mode is set, and
   an operation standby step for executing an operation standby routine which regulates a power supply section in response to the power supply control signal.

7. Television power supply control circuit comprising:
   a sensing section for detecting a viewer,
   a driving section for converting a sensing signal supplied by said sensing means to a logical level and for outputting a signal,
   a logical section for outputting a detection signal in accordance with a detection enable signal and the signal of said driving section, and
   a control section for controlling a television power supply in accordance with the detection signal,
   wherein said TV power supply supplies power in accordance with the detection signal of said logical section and in accordance with a power supply automatic mode which is set by the viewer, wherein the detection enable signal is output from said control section, and wherein said logical section comprises an AND gate which is triggered by the signal of said driving section and the detection enable signal to output the detection signal.

8. Television power supply control circuit as defined in claim 7, wherein:
   the signal output by said driving section is an absence signal,
   the detection signal output by said logical means is an absence detection signal, and
   the detection enable signal is an absence detection enable signal.

9. Television power supply control circuit as defined in claim 9, wherein when the automatic control mode is set, the power supply section supplies reduced power in response to the absence detection enable signal.

10. Television power supply control circuit as defined in claim 7, wherein said sensing section comprises a pypoelectrical sensor for sensing pypoelectricity emitted from a human body.

11. Television power supply control circuit as defined in claim 7, further comprising a deflecting section for deflecting a scanning of a display, said deflecting section being controlled by said control section in accordance with the detection signal.

* * * * *